UNITED STATES PATENT OFFICE.

GUILLIAM H. CLAMER, OF PHILADELPHIA, PENNSYLVANIA.

PROCESS OF MAKING BRASS AND COPPER ALLOYS.

1,198,618. Specification of Letters Patent. Patented Sept. 19, 1916.

No Drawing. Application filed February 16, 1915. Serial No. 8,468.

*To all whom it may concern:*

Be it known that I, GUILLIAM H. CLAMER, a citizen of the United States, and a resident of Philadelphia, in the county of Philadelphia and State of Pennsylvania, have invented a certain new and useful Process of Making Brass and Copper Alloys, of which the following is a specification.

The principal object of the present invention is to provide for making brass and copper alloys rapidly and upon a large scale and effecting not only the economies due to operations upon a large scale but also other economies which result from avoidance of waste of material, such as zinc.

The invention can be practised by melting copper in a furnace of relatively large capacity, preferably of the reverberatory type, or the process can be practised by starting with the first melted copper, that is the copper, for example, which is melted from the cathodes. The idea is that a comparatively large amount of copper is melted in a comparatively inexpensive way. For example, the copper can be cheaply melted in a large open hearth furnace and it is to be maintained at the correct "pitch", which means degree of partial oxidation. The melted copper is then drawn off into an electric furnace and zinc and other alloying constituents are added to it and the temperature brought to that proper for casting. The quantity of copper drawn into the electric furnace may be that required and can be comparatively large. The so-called "Hering type of furnace" is well adapted for the purpose of this invention. To the melted copper which has been drawn into the electric furnace there is added zinc and other alloying constituents and since the electric furnace affords perfect control of temperature and atmosphere (neutral or reducing) there is a saving in that zinc is not wasted by volatilization, and the proper casting temperature can be readily attained. If scrap is to be added it should be melted in the electric furnace so that it may not unduly oxidize and lose zinc. If desired an electric furnace of large capacity might be used for melting and maintaining the copper baths. A large quantity of copper can be readily and cheaply melted and in fact in the manufacture of copper there are produced large baths of melted copper. This melted copper can be readily brought to the proper "pitch" or condition of oxidation for making alloy.

According to my invention, I avail myself of the economy that follows from the initial use of a large mass of melted copper. The required quantity of this melted copper of proper "pitch", which has been comparatively cheaply obtained, is drawn off into an electric furnace in which it is alloyed and in which the alloy is brought to the proper casting temperature and condition for pouring. The alloying and the attainment of the proper casting temperature and condition can be accomplished because of the control of the temperature and atmosphere that is afforded by an electric furnace. Furthermore the loss of zinc by volatilization or oxidation is minimized or prevented, so that a material economy is effected. The ingots made by this process may be large. There is an economy not only in the process of manufacturing the brass but also in the subsequent handling and working of the "slab", for it costs little, if anything, more to handle and work a large "slab" than it does a small one.

What I claim is:

The process of making brass and copper alloys which consists in melting copper, introducing the previously melted copper into an electric furnace, adding alloying materials to the copper in the electric furnace, and maintaining a proper temperature to avoid volatilization during the addition of the alloying material and bringing the resulting alloy to the proper casting temperature, substantially as described.

In testimony whereof I have hereunto signed my name.

GUILLIAM H. CLAMER.

Witnesses:
HOWARD H. WOOD.
RONALD H. MCCAUGHEY.